(12) United States Patent
Doerner et al.

(10) Patent No.: US 7,958,046 B2
(45) Date of Patent: Jun. 7, 2011

(54) COMPUTER SYSTEMS AND METHODS FOR PROVIDING CREDIT INFORMATION DATA

(75) Inventors: Robert Doerner, Offenbach (DE); Adam Kiwon, Hannover (DE); Renato Zadro, Brühl (DE)

(73) Assignee: SAP AG, Walldorf (DE)

( * ) Notice: Subject to any disclaimer, the term of this patent is extended or adjusted under 35 U.S.C. 154(b) by 1544 days.

(21) Appl. No.: 10/830,300

(22) Filed: Apr. 23, 2004

(65) Prior Publication Data

US 2005/0015334 A1   Jan. 20, 2005

(30) Foreign Application Priority Data

Apr. 23, 2003   (EP) .................................... 03009230

(51) Int. Cl.
*G06Q 40/00* (2006.01)
(52) U.S. Cl. .......................................... 705/38; 705/35
(58) Field of Classification Search .................... 705/35, 705/38; 707/500
See application file for complete search history.

(56) References Cited

U.S. PATENT DOCUMENTS

| | | | | |
|---|---|---|---|---|
| 5,732,400 A | | 3/1998 | Mandler et al. ................. | 705/26 |
| 7,280,980 B1 * | | 10/2007 | Hoadley et al. ................. | 705/38 |
| 2002/0072927 A1 * | | 6/2002 | Phelan et al. ..................... | 705/1 |
| 2002/0077964 A1 * | | 6/2002 | Brody et al. ................... | 705/38 |
| 2002/0078079 A1 * | | 6/2002 | Rangan et al. ................ | 707/500 |
| 2003/0036966 A1 * | | 2/2003 | Amra et al. ..................... | 705/26 |
| 2003/0154162 A1 * | | 8/2003 | Danaher et al. ................. | 705/38 |

* cited by examiner

*Primary Examiner* — James A Kramer
*Assistant Examiner* — Hao Fu
(74) *Attorney, Agent, or Firm* — Finnegan, Henderson, Farabow, Garrett & Dunner, L.L.P.

(57) ABSTRACT

Computer systems and methods for providing credit information data are disclosed. In one embodiment, an exemplary method includes generating a first mark up language document in a requestor domain. The credit information query data may include provider identification data to enable identification of a provider of credit information data. The method further includes retrieving a first provider specific transformation document for transforming the first markup language document into a provider domain of the provider and sending the second mark up language document to the provider. The method further includes receiving a third mark up language document carrying the credit information data, where the third mark up language document is in the provider domain. The method further includes retrieving a second provider specific transformation document for transforming the third document into the requestor domain. The method further includes transforming the third mark up document by the second provider specific transformation document.

10 Claims, 4 Drawing Sheets

COMPUTER SYSTEMS AND METHODS FOR PROVIDING CREDIT INFORMATION DATA

FIELD OF THE INVENTION

The present invention relates to the field of computer systems and methods for performing business transactions and, more particularly, to computer systems and methods for providing credit information.

BACKGROUND OF THE INVENTION

Both business-to-business and business-to-consumer sales transactions are based on oral or written agreements between the buyer and the seller dictating the terms of the sale, e.g., the purchase price, the delivery date, the date by which payment must be received. This is also the case for agreements which have been entered by online communication, such as by means of an online marketplace, online shop or other means of electronic procurement.

It is common for the seller to extend credit to the buyer so that payment is not due until some time after the delivery of goods or services. This line of credit is often referred to as an "open account trade credit" or simply an "open account" and usually works well between regular trading partners who have established credit worthiness. In commerce between a buyer who is unknown to the seller, trading with an open account incurs substantial risk on the part of the seller. The risk is essentially related to the buyers ability and/or willingness to meet the payment terms of the sales agreement.

For this reason, there are many commercial credit reporting agencies such as Creditreform, TRW, EQUIFAX, and Dun & Bradstreet which provide information about the credit worthiness of individuals or businesses. When dealing with an unknown buyer, the seller must undertake to obtain credit rating information about the buyer, analyze the information, decide whether to deal with the buyer. In particular, the buyer may adjust the selling price based on the degree of risk which is expected based on the credit report.

U.S. Pat. No. 5,732,400 discloses a system and method for enabling on-line transactional services among sellers and buyers having no previous relationship with each other. The system includes a financial clearinghouse for receiving a request for goods or services from a buyer and making a real-time determination of a risk classification of the buyer utilizing an on-line repository of credit information. The financial clearinghouse determines a risk-based discount fee as a function of the buyer's risk classification in order to establish a payment amount to the seller from the clearinghouse. If the transaction is authorized by the financial clearinghouse, the financial clearinghouse transmits the payment amount to the seller and transmits an invoice to the buyer for the purchase price of the transaction. The system can also include a broker coupled to the financial clearinghouse for providing an on-line order acceptance and processing capability between the buyers and sellers. This system attempts to facilitate the process of credit analysis and pricing based on credit worthiness.

A disadvantage of this system is that it does not enable automatic communication with various credit reporting agencies as such credit reporting agencies usually have their proprietary interfaces.

SUMMARY OF THE INVENTION

Embodiments consistent with the present invention provide computer systems and methods for providing of credit information. The credit information may be requested and obtained from any provider of a plurality of providers. In one embodiment, this is accomplished by transforming requests to the providers for credit information from and the responses of a provider containing the requested credit information to the domain of a requesting clearance platform of a computer system.

One advantage of such a computer system is that a user does not need to be aware of different proprietary formats which are supported by the providers. Instead, the user can rely on single data entry format of the clearance platform which is automatically transformed into the domain of the selected provider. Furthermore, the selected provider's response may be reverse transformed into the requestor domain.

In accordance with an embodiment of the invention, an extended mark up language (XML) document may be generated in the requestor domain by the clearance platform. The XML document may have a format, which has been defined by means of a XSD document during the built time of the clearance platform. The XML document may contain credit information query data, i.e., provider identification data for identification of the credit information provider which has been selected and additional information regarding the business entity or person for which the credit information is requested.

The credit information query data can be entered manually by a user of the system or at least parts of the required credit information query data can be obtained by extracting the data from a database. Alternatively, the credit information query data may be transmitted from a seller's computer to the clearance platform by means of an electronic message.

The transformation of the XML document containing the credit information query data may be performed by means of a provider specific XSL document. The XSL document may specify the transformation to be performed on the XML document containing the credit information query data in order to bring this document into the domain of the selected provider. The result of the transformation may be an XML document in the provider domain which is sent as, e.g., a HTTP request to the selected provider.

The provider may respond with an XML document containing the requested credit information. This document is in the domain of the provider corresponding to the proprietary provider format definition. This document may be transformed into the domain of the requestor by means of another provider specific transformation document. Preferably, this may also be an XSL document which specifies the transformation to be performed in order to reverse transfer the XML document containing the credit information into the requestor domain. The result of the reverse transformation may be an XML document containing the credit information and which is understandable by the clearance platform, i.e., the requestor.

In one exemplary embodiment of the invention, the credit information may be visualized via the user interface such that a human can evaluate the credit information in order to make a decision whether a credit request can be accepted or is to be declined. Alternatively, or in addition, the credit information can be evaluated automatically and the result of the automatic evaluation may be sent to the seller.

BRIEF DESCRIPTION OF THE DRAWINGS

In the following preferred embodiments of the invention will be described in greater detail by making reference to the drawings in which.

DESCRIPTION OF THE EMBODIMENTS

Figure 1:
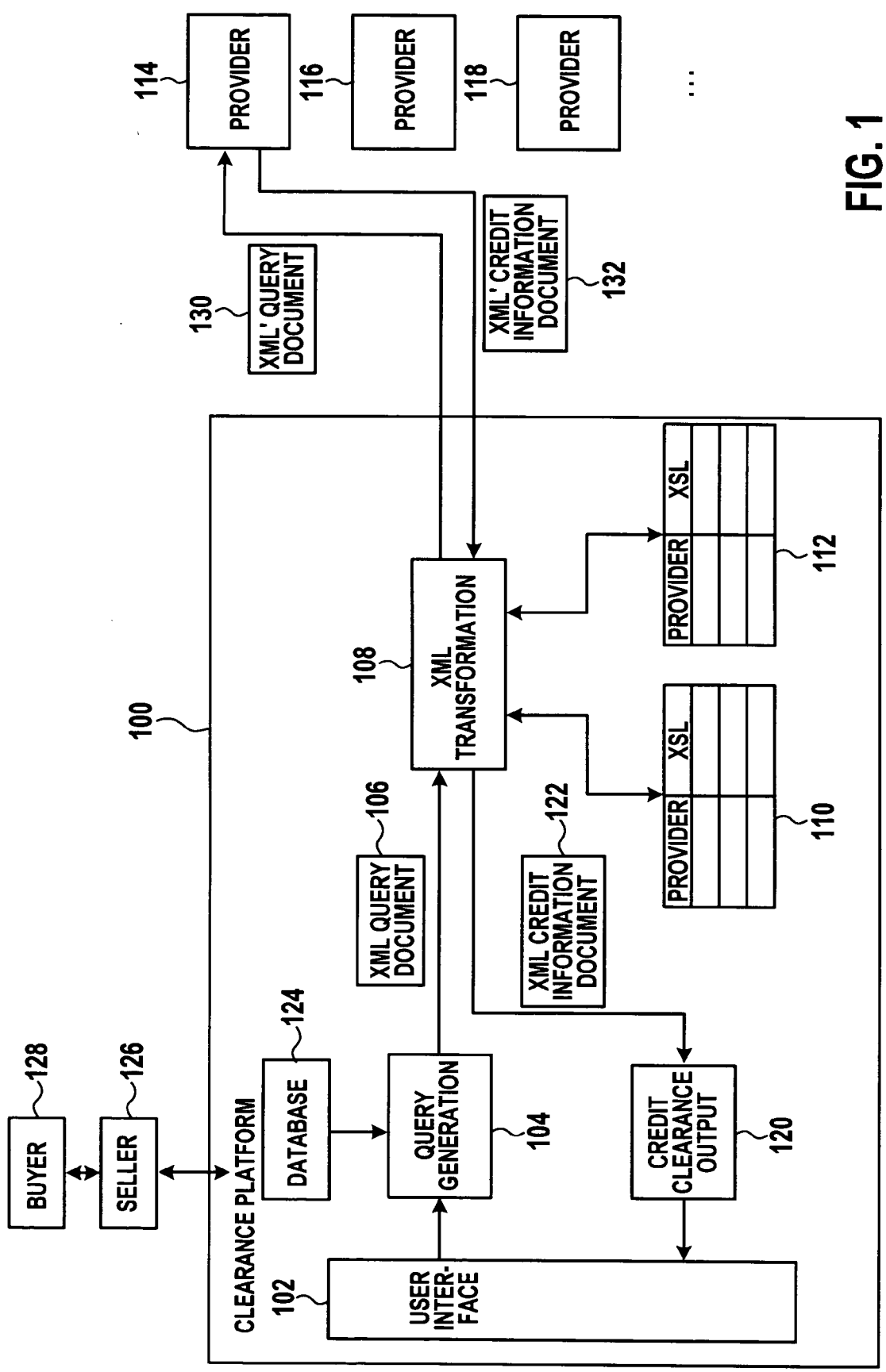
FIG. 1 is a block diagram of an exemplary computer system for providing of credit information, consistent with an embodiment of the invention.

FIG. 1 shows a block diagram of an exemplary computer system 100 which provides a credit clearance platform. Computer system 100 may have user interface 102 through which an operator can enter data to specify a desired credit information query. This may include at least data to identify the person or business entity for which the credit information is required and the selected provider of the credit information.

User interface 102 may be coupled to query generation module 104 which may generate XML query document 106. XML query document 106 may carry the data which has been entered via the user interface in order to specify the credit information query. XML query document 106 may be an instance of an XSD scheme which is provided to query generation module 104 at the built time of computer system 100.

Query generation module 104 may be coupled to XML transformation module 108. XML transformation module 108 may be coupled to table 110 which may contain a pointer to an XSL document for each provider which can be selected to provide the credit information. Each one of these XSL documents may specify an XSL transformation to be performed on XML query document 106 in order to bring XML query document 106 into the domain of the selected provider. This transformation can be performed in accordance with the W3C recommendation (http://www.w3.org/TR/xslt). By means of table 110 XML transformation module 108 can thus access an XSL document for each provider to perform a transformation into the corresponding provider domain.

Further, XML transformation module 108 may be coupled to table 112 which may contain a pointer to an XSL document for each one of the providers which can be selected to perform the credit information query. These XSL documents may specify the transformation to bring an XML document delivered by a provider in response to the credit information query into the domain of the clearance platform.

Computer system 100 can communicate with various provider computer systems 114, 116, 118 belonging to different providers of credit information, such as financial clearing houses. For example, provider computer system 114 may be a Dun & Bradstreet financial clearing house system, provider computer system 116 may be a Kreditreform financial clearing house system, provider computer system 118 may be a TRW financial clearing house system, etc. Preferably, the communication between computer system 100 and any one of the provider computer systems 114, 116, 118, . . . may be done over the Internet, an extranet or an intranet using the HTTP protocol.

XML transformation module 108 may be coupled to credit clearance output module 120 which may be coupled to user interface 102. Credit clearance output module 120 may receive XML credit information document 122 from XML transformation module 108. XML credit information document 122 may be in the domain of the clearance platform and can be processed by credit clearance output module 120, e.g., to generate a display of the credit information data on user interface 102.

Further, computer system 100 may have database 124. For example, database 124 may contain the address and/or other data of the person or business entity for which the credit information query is to be performed. This prevents a user to enter all of the data which is required to unequivocally identify the person or business entity via user interface 102. For example, the user may enter an unequivocal identifier, which is used by clearance platform 100, such as an internal customer reference, which may then be used as a key by query generation module 104 to access the full record of information available for the specified person or business entity.

In one exemplary embodiment of the invention, seller 126 may request credit clearance for buyer 128 which desires to purchase a product or service from seller 126 for a certain price. Seller 126 may communicate details of buyer 128 and the purchase amount to a user of computer system 100. The user can then manually input this data through user interface 102.

Alternatively, the clearance request may be received electronically from seller 126 by computer system 100 bypassing user interface 102. This is especially convenient if seller 126 is an online shop. Depending on the nature of seller 126 the resulting credit information may be provided by the user of computer system 100 to seller 126 by means of any traditional communication method, such as by making a telephone call, sending a fax or the like, or—if seller 126 is an online shop—seller 126 may obtain the credit information data as an electronic message which is automatically processed by the online shop computer system in order to decide whether to accept or decline the credit request of buyer 128 for the purchase of the desired product or service. In operation, a credit information query may be triggered by the user of computer system 100 by manually inputting of the credit information query or by receiving an electronic credit information query request from seller 126. In response, query generation module 104 may generate XML query document 106 which contains the data specifying the requested credit information query.

As a further preferred alternative, computer system 100 may not be an external clearance platform, but may be an integral part of the seller's transactional system. For example, computer system 100 may implement an online shop of the seller in addition to the credit clearance platform. In this case, the electronic credit information query request can be passed from the online shop directly to the credit clearance platform within computer system 100.

XML query document 106 may be received by XML transformation module 108. XML transformation 108 module may use the provider specified in XML query document 106 as a key to obtain a pointer to the XSL document of that provider from table 110. Next, XML query document 106 may be transformed as specified by the XSL document identified by the pointer to XML' query document 130 in the domain of the selected provider as indicated in XML query document 106. By way of example, it is assumed that Dun & Bradstreet has been selected as a provider, i.e., provider computer system 114.

Computer system 100 may send XML' query document 130 to provider computer system 114 by means of a HTTP request. XML' query document 130 complies to the proprietary XML scheme definition used by provider computer system 114. After receipt of XML' query document 130, provider computer system 114 may start processing of the credit information request as specified in the XML' query document 130. The result may be output by provider computer system 114 as XML' credit information document 132 and sent as a HTTP response to XML transformation module 108.

In response, XML transformation module 108 may retrieve the pointer to the XSL document of the pertinent provider, such as, Dun & Bradstreet, which may be required for transformation of XML' credit information document 132 into the domain of the clearance platform from table 112. By means of this XSL document, XML transformation module 108 may transform XML' credit information document 132 to XML credit information document 122 which has a format which complies to the XML scheme definition used in the domain of the credit clearance platform implemented by computer system 100. Credit clearance output module 120 may generate an image in order to visualize the credit information data contained in the XML credit information document via user interface 102. Alternatively or in addition, credit clearance output module 120 may send an electronic message to seller 126 in order to inform seller 126 of the result of the credit clearance.

It is to be noted that the credit clearance platform of FIG. 1 provides a high degree of flexibility as it is not restricted by any one of the proprietary interfaces used by the various providers of credit information. This way the most suitable provider can be freely selected by the user or the seller without restriction.

Figure 2:
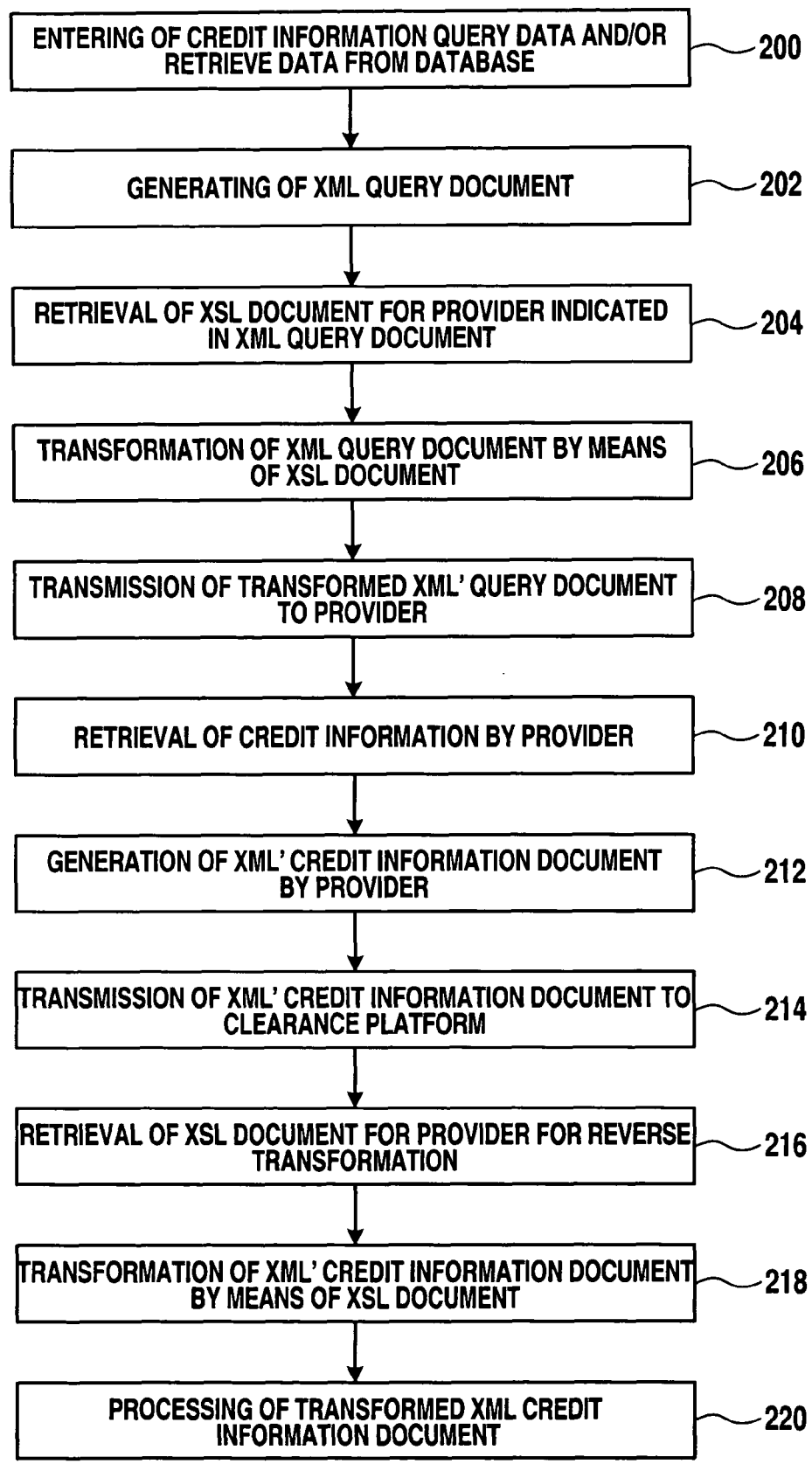
FIG. 2 is illustrative of a flow chart for an exemplary method for processing a credit information request, consistent with an embodiment of the invention.

FIG. 2 shows a flow chart of an exemplary corresponding method. In step 200, data may be entered by a user in order to specify the desired credit information query. Preferably, at least some of the data may be retrieved from a database in order to prevent the user to manually input the complete credit information query data. In step 202, an XML query document 106 may be generated, which carries the credit information query data. XML query document 106 may be an instance of an XML scheme definition in the domain of the requestor, i.e., the credit clearance platform. In one embodiment, query generation module 104 (FIG. 1) may generate XML query document 106.

In step 204, the provider indicated in the XML query document 106 may be used as a key in order to retrieve an XSL document which specifies a transformation of the XML query document into the domain of the selected provider. In step 206, the transformation of the XML query document 106 may be performed by means of the XSL document retrieved in step 204. This provides the XML' query document 130 in the domain of the provider. In one embodiment, steps 204 and 206 may be performed by XML transformation module 108.

The XML' query document 130 may be transmitted from the credit clearance platform to the provider (step 208). For example, this may be done by means of a HTTP request.

When the XML' query document 130 is received by the computer system of the provider the retrieval of the credit information as requested in the XML' query document may be performed (step 210). In one embodiment, provider computer system 114 may perform this step. The credit information which may be obtained by the provider may be used as a basis to generate an XML' credit information document 130 by computer system 114 (or 116 or 118) of the provider (step 212). The XML' credit information document 132 may be an instance of the XML scheme definition used by the provider and is thus in the provider domain.

In step 214, the XML' credit information document may be transmitted to the credit clearance platform. For example this may be done by means of a HTTP response.

In step 216, the XSL document, which may be required to transform XML' credit information document 132 from the provider domain into the domain of the credit clearance platform may be retrieved by using the provider as a key. In one embodiment, XML transformation module 108 may perform this step by retrieving a pointer to the XSL document for the relevant provider by accessing table 110, for example. In step 218, the transformation of XML' credit information document 132 into the domain of the credit clearance platform may be performed, by XML transformation module 108, as specified by the XSL document retrieved in step 216. This provides an XML credit information document 122 in the domain of the credit clearance platform.

In step 220, XML credit information document 122 may be processed by the credit clearance platform, for example in order to inform a user of the credit clearance platform of the obtained credit information and/or by automatically processing of the credit information in order to evaluate whether a requested credit amount can be accepted or needs to be declined.

Figure 3:
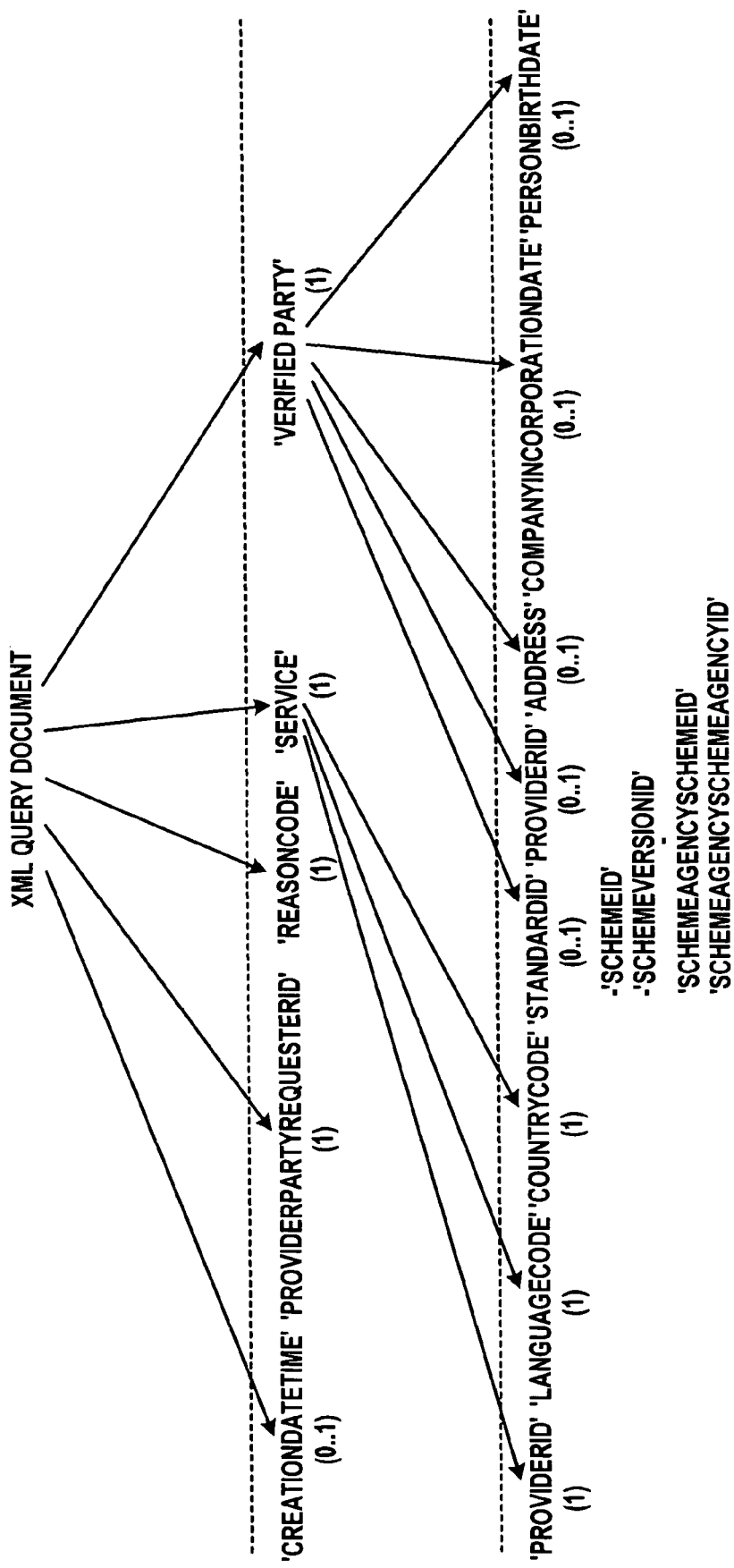
FIG. 3 is illustrative of an exemplary tree structure of an XML query document in the requestor domain, consistent with an embodiment of the invention.

FIG. 3 shows an exemplary tree structure illustrating the XML scheme definition which may be used for generating an XML query document (e.g., XML query document 106 of FIG. 1). The first level of the tree may have the data fields 'CreationDateTime', 'ProviderPartyRequesterID', 'ReasonCode', 'Service', and 'Verified Party'.

The data field 'CreationDateTime' may contain a time stamp which indicates the time when XML query document 106 has been generated.

'ProviderPartyRequesterID' may be a data field for an identifier of the selected provider given by the credit clearance platform.

'ReasonCode' may be a data field to indicate the reason for the request of the credit information. Under some legislations, e.g., under German law, the indication of a reason for the credit information request is a legal requirement.

'Service' may be a data field which enables to specify the desired information product of the provider. This data field may have a substructure on the second tree level including 'ProviderID', 'LanguageCode', and 'CountryCode', where 'ProviderID' contains the name of the information product of the provider, 'LanguageCode' contains a data field to indicate the desired language of the credit information and 'CountryCode' serves to indicate the country of origin of the credit clearance platform.

'Verified Party' may serve to specify the person or business entity for which the credit information is requested. This may have a sub-structure on the second tree level comprising 'StandardID', 'ProviderID', 'Address', 'CompanyIncorporationDate', 'PersonBirthDate'.

The data field 'StandardID' may serve to identify the person or business entity for which the credit information is required. This can be done by means of a standardized unequivocal identification number which is proprietary to the issuer of the identification number or is contained, e.g., in the UN/EDIFACT-code list, DE3055.

The data field 'StandardID' may have the attributes 'SchemeID', 'SchemeVersionID', 'SchemeAgencySchemeID' and 'SchemeAgencySchemeAgencyID'.

'SchemeID' may be the name which is given to the identification scheme by the issuer of the proprietary unequivocal identification number.

'SchemeVersionID' may be the version of the identification scheme.

'SchemeAgencyID' may be the identification number of the issuer of the identification number.

'SchemeAgencySchemeID' may be only required in case a proprietary identification number of an issuer is used. In this case, the field may serve to indicate the name of the proprietary scheme used by a standardised issuing instance.

'SchemeAgencySchemeAgencyID' may only be used in case a proprietary identification number is used. In this case, an identification number of the standardised issuer instance may be indicated.

'ProviderID' may be a data field to indicate an identification number of the person or business entity which is used by the provider.

'Address' may contain address data. This data field can have a complex sub-structure for all relevant address data.

'CompanyIncorporationDate' may be a data field for the date of incorporation of the business entity for which the credit information is requested 'PersonBirthDate' may be a data field to indicate the birth date of the person for which the credit information is requested.

For example, Dun & Bradstreet may be selected as a provider of the credit information. In this case, XML query document 106 may be generated in accordance with the XML scheme definition illustrated in FIG. 3 which may contain an identifier in the data field 'ProviderPartyRequesterID' which is assigned to Dun & Bradstreet by the credit clearance platform. In this instance the data field 'ProviderID' can contain one of Dun & Bradstreet's product names, i.e., 'Business Information Report', 'Comprehensive Report', 'Credit Check Report', 'Payment Analysis Report', 'Global Family Linkage', . . . (cf. http://www.dnb.com/us/dbproducts/BusArea.asp?id=4&lang_id=1012&BusAreaName=risk+management+solutions)

The data field 'StandardID' contains the D & B D-U-N-S number of the person or business entity. 'SchemeID' contains the name of the scheme which is 'D & B D-U-N-S' number.
(cf. http://www.dnb.com/US/duns_update/duns_update_print.asp)

The resulting XML query document 106 which may be an instance of the XML scheme definition illustrated in FIG. 3 then may be transformed into the Dun & Bradstreet domain by means of an XSL document which specifies the required transformation of the XML query document.

Figure 4:
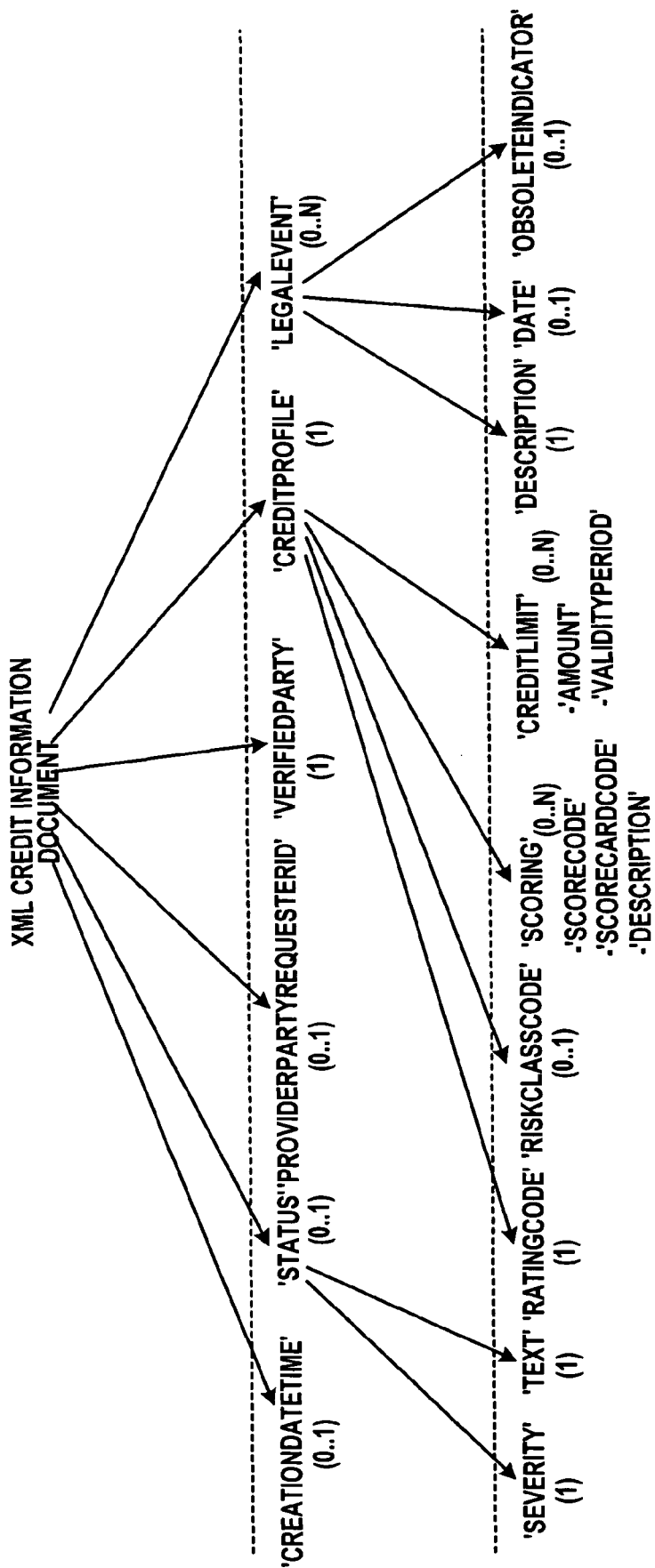
FIG. 4 is illustrative of an exemplary tree structure of an XML credit information document in the requestor domain; consistent with an embodiment of the invention.

FIG. 4 is illustrative of an exemplary tree structure of an XML scheme definition for the XML credit information document (e.g., XML credit information document 122 of FIG. 1) in the domain of the credit clearance platform. In accordance with this XML scheme definition, XML credit information document 122 may have data fields 'CreationDateTime', 'StatusProviderPartyRequesterID', 'VerifiedParty', 'CreditProfile', and 'LegalEvent' on the first level of hierarchy of the tree structure.

'CreationDateTime' may be a time stamp which indicates when the XML credit information document has been generated.

'Status' may be used to indicate technical data, such as when the credit information data was last updated. Further 'Status' may have a sub-structure including the data fields 'Severity' which serves to indicate an error message and 'Text' for textual information.

'ProviderPartyRequesterID' may be an identification number which is used to identify the requestor of the credit information, i.e., the credit clearance platform, by the provider.

'VerifiedParty' may be the same as in the tree structure of FIG. 3, including the sub-structure.

'CreditProfile' may contain the credit information. This data field may have the sub-structure 'RatingCode', 'RiskClassCode', 'Scoring' and 'CreditLimit' on the second level of hierarchy of the tree structure.

'RatingCode' may be a data field for indication of the credit worthiness of a scale defined by the provider.

'RiskClassCode' may be is a data field to indicate the risk class of the person or business entity.

'Scoring' may be is a data field to indicate the credit worthiness by means of a so-called score card. This may have the attributes 'ScoreCode' (a point value), 'ScorecardCode' (name of the score card scheme), and 'Description' (description of the score card scheme).

'CreditLimit' may be a data field to indicate the maximum credit which can be given to the person or business entity for which the credit information is requested and which is suggested by the provider. This data field may have the attributes 'Amount' to indicate the amount and currency of the credit limit and 'ValidityPeriod' which serves to indicate the term of validity of the suggested credit limit.

'LegalEvent' may be a data field to indicate a relevant legal event, such as insolvency or chapter 11 proceedings. This data field may have the sub-structure 'Description' to give a description of the legal event, 'Date' to indicate the date of the legal event and 'ObsoleteIndicator' to indicate whether the corresponding legal proceedings is terminated.

The cardinalities of the data fields are indicated in brackets in the trees of FIG. 3 and FIG. 4. For example, the data field 'LegalEvent' of the tree shown in FIG. 4 has the cardinality 0 . . . n, which means that there can be no entry or an arbitrary number of n entries in this data field. The data field 'Description' of the corresponding substructure has the cardinality 1 which means that this data field must contain an entry for each entry in 'LegalEvent'. Further, the data field 'Date' of the same substructure has the cardinality 0 . . . 1, which means that each entry in 'LegalEvent' can have a date information. A data information is however not required.

When an XML document is received from the provider in response to the credit information query (cf. XML' credit information document 132 of FIG. 1), this document may be transformed to the XML scheme definition as illustrated in FIG. 4. This way the proprietary format used by the selected provider may be translated to a format which is understandable to the credit clearance platform.

One skilled in the art will appreciate that embodiments of the present disclosure may be implemented in various system or network environments to provide credit information. Such environments and applications may be specially constructed for performing the various processes and operations of the disclosure or they may include a general-purpose computer or computing platform selectively activated or reconfigured by program code to provide the necessary functionality. The processes disclosed herein are not inherently related to any particular computer or other apparatus, and may be implemented by a suitable combination of hardware, software, and/or firmware. For example, various general-purpose machines may be used with programs written in accordance with teachings of the disclosure, or it may be more convenient to construct a specialized apparatus or system to perform the required methods and techniques.

What is claimed is:

1. A computer system for providing of credit information data, the computer system comprising:

a first mark up language document generation module for generating a first mark up language document carrying credit information query data, the first mark up language document being in a requestor domain and the credit information query data comprising provider identification data identifying a provider of the credit information, to which a query is to be sent, from among a plurality of providers;

a first storage device for storing a plurality of first provider-specific transformation documents, each of the plurality of first provider-specific transformation documents corresponding to one of the plurality of providers;

a second storage device for storing a plurality of second provider-specific transformation documents, each of the plurality of second provider-specific transformation documents corresponding to one of the plurality of providers;

a first retrieving module for retrieving a first provider-specific transformation document corresponding to the provider identified by the provider identification data;

a first transformation module for transforming the first mark up language document to a second mark up language document in a provider domain of the provider by the first provider-specific transformation document;

a sending module for sending the second mark up language document to the provider;

a receiving module for receiving a third mark up language document carrying the credit information data, the third mark up language document being in the provider domain;

a second retrieving module for retrieving a second provider-specific transformation document corresponding to the provider identified by the provider identification data;

a second transformation module for transforming the third mark up language document to a fourth mark up language document in the requestor domain by the second provider-specific transformation document; and a user interface for providing visualization of the credit information data.

2. The computer system of claim 1, wherein the mark up language is an extended mark up language and the first and second provider-specific transformation documents are XSL documents.

3. The computer system of claim 1, wherein first retrieving module and the second retrieving module are adapted to perform the retrieval operation using the provider identification data as a key.

4. The computer system of claim 1, wherein the credit information query data includes an unequivocal identifier of a business entity for which the credit information is requested.

5. A computer-implemented method of providing credit information data, the method comprising the following steps performed by a computer system:

generating, by the computer system, a first mark up language document carrying credit information query data, the first mark up language document being in a requestor domain and the credit information query data comprising provider identification data identifying a provider of the credit information data, to which a query is to be sent, from among a plurality of providers;

retrieving, by the computer system, a first provider-specific transformation document from a plurality of first provider-specific transformation documents, each of the plurality of first provider-specific transformation documents corresponding to one of the plurality of providers, wherein the retrieved first provider-specific transformation document corresponds to the provider identified by the provider identification data;

transforming, by the computer system, the first mark up language document to a second mark up language document in a provider domain of the provider by the first provider-specific transformation document;

sending, by the computer system, the second mark up language document to the provider;

receiving, by the computer system, a third mark up language document carrying the credit information data, the third mark up language document being in the provider domain;

retrieving, by the computer system, a second provider-specific transformation document from a plurality of second provider-specific transformation documents, each of the plurality of second provider-specific transformation documents corresponding to one of the plurality of providers, wherein the retrieved second provider-specific transformation document corresponds to the provider identified by the provider identification data;

transforming, by the computer system, the third mark up language document to a fourth mark up language document in the requestor domain by the second provider-specific transformation document; and visualizing the credit information via a user interface.

6. The method of claim 5, wherein the mark up language is an extended mark up language and the first and second provider-specific transformation documents are XSL-documents.

7. The method of claim 5, wherein the retrieval of the first and second provider-specific transformation documents is performed by using the provider identification data as a key.

8. A computer program product, tangibly embodied in a computer-readable storage medium, for providing credit information data, the computer program product comprising program means for performing, when executed by a computer system, the steps of:

generating a first mark up language document carrying credit information query data, the first mark up language document being in a requestor domain and the credit information query data comprising provider identification data identifying a provider of the credit information data, to which a query is to be sent, from among a plurality of providers;

retrieving a first provider-specific transformation document from a plurality of first provider-specific transformation documents, each of the plurality of first provider-specific transformation documents corresponding to one of the plurality of providers, wherein the retrieved first provider-specific transformation document corresponds to the provider identified by the provider identification data;

transforming the first mark up language document to a second mark up language document in a provider domain of the provider by the first provider-specific transformation document;

sending the second mark up language document to the provider;

receiving a third mark up language document carrying the credit information data, the third mark up language document being in the provider domain;

retrieving a second provider-specific transformation document from a plurality of second provider-specific transformation documents, each of the plurality of second provider-specific transformation documents corresponding to one of the plurality of providers, wherein the retrieved second provider-specific transformation document corresponds to the provider identified by the provider identification data;

transforming the third mark up language document to a fourth mark up language document in the requestor domain by the second provider-specific transformation document; and visualizing the credit information via a user interface.

9. The computer program product of claim 8, wherein the mark up language is an extended mark up language.

10. The computer program product of claim 8, wherein the retrieval of the first and second provider-specific transformation documents is performed by using the provider identification data as a key.

* * * * *